(12) United States Patent
Chun et al.

(10) Patent No.: US 8,553,614 B2
(45) Date of Patent: Oct. 8, 2013

(54) METHOD OF TRANSMITTING CHANNEL QUALITY INDICATOR

(75) Inventors: Jin Young Chun, Anyang-si (KR); Bin Chul Ihm, Anyang-si (KR); Wook Bong Lee, Anyang-si (KR); Moon Il Lee, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 561 days.

(21) Appl. No.: 12/448,677

(22) PCT Filed: Mar. 28, 2008

(86) PCT No.: PCT/KR2008/001761
§ 371 (c)(1),
(2), (4) Date: Jun. 30, 2009

(87) PCT Pub. No.: WO2008/120920
PCT Pub. Date: Oct. 9, 2008

(65) Prior Publication Data
US 2010/0254272 A1      Oct. 7, 2010

(30) Foreign Application Priority Data

Mar. 29, 2007  (KR) .................. 10-2007-0030993

(51) Int. Cl.
*H04W 4/20*  (2009.01)
(52) U.S. Cl.
USPC .......................................... 370/328; 455/69
(58) Field of Classification Search
USPC ......... 370/252, 310, 328, 329, 343, 346, 431, 370/437, 464, 465, 480, 496; 455/67.11, 455/68, 69

See application file for complete search history.

(56) References Cited

U.S. PATENT DOCUMENTS

| 6,904,290 | B1 | 6/2005 | Palenius |
| 7,292,874 | B2 | 11/2007 | Cave et al. |
| 2006/0039318 | A1* | 2/2006 | Oh et al. ........................ 370/328 |
| 2006/0136790 | A1* | 6/2006 | Julian et al. .................... 714/704 |
| 2007/0026810 | A1* | 2/2007 | Love et al. .................. 455/67.11 |
| 2007/0026813 | A1* | 2/2007 | Khan .............................. 455/69 |
| 2007/0047502 | A1* | 3/2007 | Marinier et al. ............... 370/335 |
| 2007/0098093 | A1* | 5/2007 | Kwon et al. ................... 375/260 |
| 2007/0098098 | A1* | 5/2007 | Xiao et al. ..................... 375/260 |
| 2007/0115796 | A1* | 5/2007 | Jeong et al. ................... 370/203 |
| 2007/0242770 | A1* | 10/2007 | Kim et al. ..................... 375/267 |
| 2007/0244696 | A1* | 10/2007 | Hara et al. ..................... 704/201 |

FOREIGN PATENT DOCUMENTS

JP          2003-188816 A       7/2003

* cited by examiner

*Primary Examiner* — Michael Thier
*Assistant Examiner* — Curtis A Alia
(74) *Attorney, Agent, or Firm* — McKenna Long & Aldridge LLP (57) ABSTRACT

A method of transmitting channel quality indicator (CQI) includes obtaining CQI of each of the plurality of sub-bands, selecting a first sub-band having the best CQI of the plurality of sub-bands, transmitting the best CQI of the first sub-band at a first transmission cycle and transmitting a difference value between the best CQI of the first sub-band and a CQI of the first sub-band at a second transmission cycle. Signalling overhead due to CQI transmission can be reduced.

5 Claims, 5 Drawing Sheets

Fig. 9

METHOD OF TRANSMITTING CHANNEL QUALITY INDICATOR

This application claims priority to PCT/KR2008/001761 filed on Mar. 28, 2008, U.S. and Korean Patent Application No. 10-2007-0030993 filed on Mar. 29, 2007, both of which are hereby incorporated by reference in their entirety.

TECHNICAL FIELD

The present invention relates to wireless communication, and more particularly, to a method of transmitting channel quality indicator in a wireless communication system.

BACKGROUND ART

In order to transmit high quality and high capacity of data under limited radio resources in wireless communication systems, a variety of transmission methods have been developed.

A closed-loop system uses a feedback channel from a user equipment to a base station in order to transfer feedback information. In the closed-loop system, after receiving feedback information from the user equipment on the feedback channel, the base station maximizes the performance by adjusting several system parameter, such as power level and transmission format, based on the feedback information. For example, adaptive modulation and coding (AMC) scheme increase link performance by adjusting modulation and coding scheme (MCS) on the feedback information. When channel condition is good, the data rate is increased and when channel condition is bad, the data rate is lowered. Thus, efficient transmission can be supported and, therefore, an average transmission rate can be increased.

An example of the feedback information is channel quality indicator (CQI). In general, CQI is measured by a user equipment and is feedback through uplink channel. The base station can assign the most appropriate resources to the user equipment based on the CQI.

For example, it is assumed that 5 bits ($2^5$=32 level) are used for CQI transmission. CQI values between −10 dB(decibel) and 22 dB can be quantized and represented every 1 dB distance. Or, CQI can be represented by one of 32 MCS levels. The 5 bits of CQI are channel-coded and then transmitted. If CQI is missed or distorted during transmission, AMC scheme can be much degraded. Accordingly, CQI needs to have high code rate to guarantee reliable transmission. But high code rate requires lots of radio resources.

In particular, in a multi-carrier system based on Orthogonal Frequency Division Multiplexing (OFDM), CQI may differ per on frequency (sub-carrier) basis. To acquire perfect channel information, it is needed that CQIs for every sub-carrier are measured and reported. But this may cause signaling overhead and low data rate.

Accordingly, there is a need for a method of efficiently transmitting CQI.

DISCLOSURE OF INVENTION

Technical Problem

A method of transmitting channel quality indicator to reduce signaling overhead is provided.

Technical Solution

In one aspect, a method of transmitting channel quality indicator (CQI) in a wireless communication system is provided. The method includes obtaining CQI of each of the plurality of sub-bands, selecting a first sub-band having the best CQI of the plurality of sub-bands, transmitting the best CQI of the first sub-band at a first transmission cycle and transmitting a difference value between the best CQI of the first sub-band and a CQI of the first sub-band at a second transmission cycle.

In another aspect, a method of transmitting channel quality indicator (CQI) in a wireless communication system is provided. The method includes transmitting a first CQI of a first sub-band selected from a plurality of sub-bands at a first transmission cycle, transmitting a difference value between the first CQI and a second CQI of a second sub-band at the first transmission cycle, the second sub-band selected from the plurality of sub-bands and transmitting a difference value between the first CQI and a CQI of the first sub-band at a second transmission cycle.

In still another aspect, a method of receiving channel quality indicator (CQI) in a wireless communication system is provided. The method includes receiving a first CQI of a first sub-band at a first transmission cycle, the first sub-band having the best CQI of the plurality of sub-bands, receiving a first difference value between the first CQI and a second CQI of a second sub-band at the first transmission cycle, the second sub-band selected from the plurality of sub-bands, receiving a second difference value between the first CQI of the first sub-band and a CQI of the first sub-band at a second transmission cycle and obtaining a CQI of the second sub-band by summing up the first CQI, the first difference value and the second difference value at the second transmission cycle.

Advantageous Effects

Signalling overhead due to CQI transmission can be reduced.

MODE FOR THE INVENTION

Figure 1:
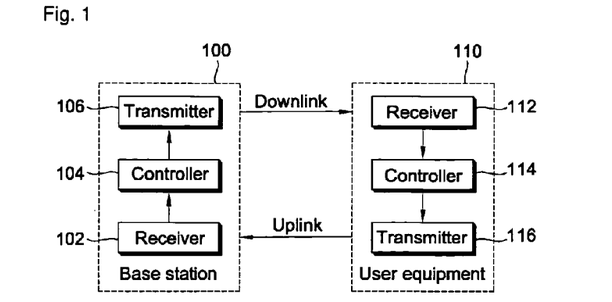
FIG. 1 is a block diagram showing a communication system in accordance with an embodiment of the present invention.

FIG. 1 is a flowchart illustrating transmission of control signals and feedback information between a base station and a user equipment.

Referring to FIG. 1, a communication system includes a base station (BS) 100 and a user equipment (UE) 110. The communication systems are widely deployed to provide a variety of communication services such as voice and packet data. The base station 100 generally refers to a fixed station communicating with the user equipment 110 and can also be referred to as another terminology, such as node-B, a base transceiver system (BTS) or an access point. The user equipment 110 can be fixed or mobile and can also be referred to as another terminology, such as a mobile station (MS), a user terminal (UT), a subscriber station (SS) or a wireless device.

The base station 100 includes a receiver 102, a controller 104 and a transmitter 106. The receiver 102 receives data and CQI through an uplink channel. The controller 104 can schedule a transmission format, a power level, a data rate, etc. of the transmitter 106 based on received CQI. The transmitter 106 processes data according to decided transmission format, power level, data rate, and so on and transmits the processed data to the user equipment 110 through a downlink channel. The base station 100 assigns the best resources to the user equipment 110 on the basis of feedback CQI, thus increasing data transmission performance.

The user equipment 110 includes a receiver 112, a controller 114 and a transmitter 116. The receiver 112 receives data through the uplink channel. The data can include a pilot signal or a preamble for CQI measurement. The receiver 112 measures CQI based on information included in the data. The controller 114 schedules the measured CQI according to a channel feedback method. The transmitter 116 transmits the scheduled CQI to the base station 100 through the uplink channel.

Figure 2:
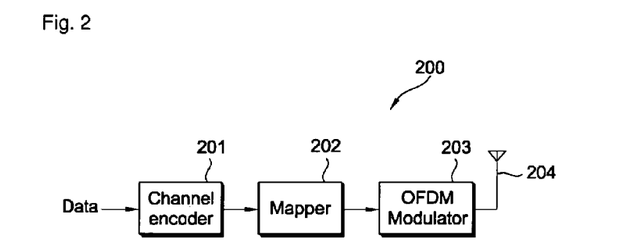
FIG. 2 is a block diagram showing a transmitter in accordance with an embodiment of the present invention.

FIG. 2 is a block diagram showing a transmitter in accordance with an embodiment of the present invention.

Referring to FIG. 2, a transmitter 200 includes a channel encoder 201, a mapper 202 and an OFDM modulator 203. The transmitter 200 can be the transmitter 106 of the base station 100 or the transmitter 116 of the user equipment 110.

The channel encoder 201 encodes input data according to a predetermined coding method, thus forming coded data. The mapper 202 modulates the coded data according to a predetermined modulation method and maps the modulated data to symbol representing a location according to an amplitude and phase constellation. The OFDM modulator 203 transforms the input symbols into OFDM symbols. The OFDM modulator 203 can transform the input symbols into time domain samples by performing inverse fast Fourier transform (IFFT) on the input symbols. To the transformed time domain samples can be added a cyclic prefix (CP). The OFDM symbols output from the OFDM modulator 203 are transmitted through an antenna 204.

Figure 3:
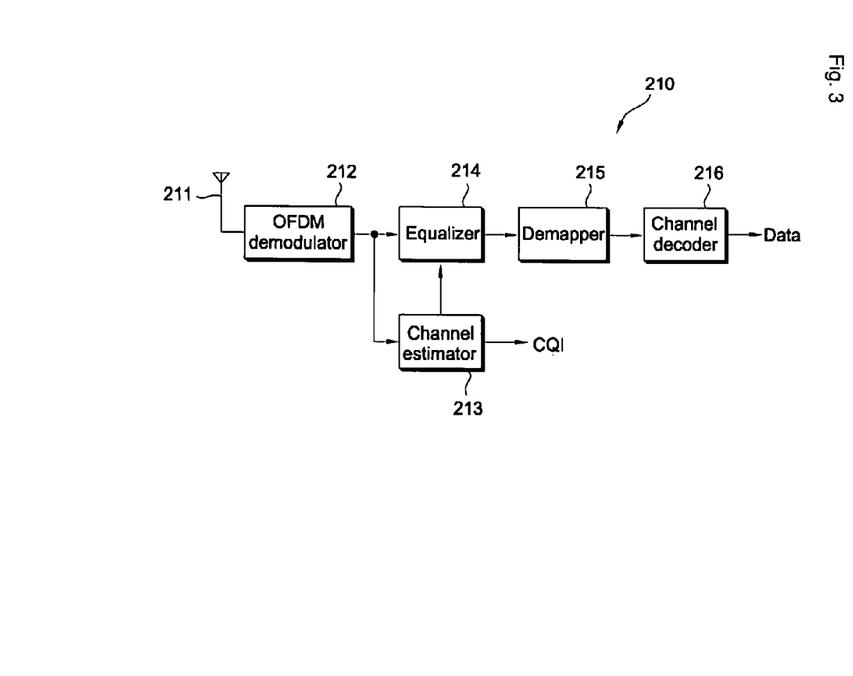
FIG. 3 is a block diagram showing a receiver in accordance with an embodiment of the present invention.

FIG. 3 is a block diagram showing a receiver in accordance with an embodiment of the present invention.

Referring to FIG. 3, a receiver 210 includes an OFDM demodulator 212, a channel estimator 213, an equalizer 214, a demapper 215 and a channel decoder 216. The receiver 210 can be the receiver 102 of the base station 100 or the receiver 112 of the user equipment 110.

A signal received through a receiving antenna 211 is transformed into symbols of the frequency domain by the OFDM demodulator 212. The OFDM demodulator 212 removes a CP from the input signal and can perform fast Fourier transform (FFT) on the signal. The channel estimator 213 estimates a channel from a received signal. Channel estimation can be performed in not only the channel estimator 213, but also the controller 114 of the user equipment 110. The equalizer 213 equalizes the output symbols of the OFDM demodulator 212 through the estimated channel and transmits the equalized symbols to the demapper 215. The demapper 215 and the channel decoder 216 perform an inverse process of the signal processing schemes, which are performed in the channel encoder 201 and the mapper 202 of the transmitter 200.

A single-input single-output (SISO) in which the transmitter 200 and the receiver 210 have one transmission antenna and one reception antenna, respectively, has been described above. But, it is understood that skilled in the art can apply the present inventive concept to a multiple-input multiple-output (MIMO) system.

It has been described that the transmitter 200 and the receiver 210 employ the OFDM (Orthogonal Frequency Division Multiplexing)/OFDMA (Orthogonal Frequency Division Multiple Access) scheme. However, the present inventive concept is not limited to the above scheme and can also be applied to other multiple access schemes, such as TDMA (Time Division Multiple Access) and CDMA (Code Division Multiple Access).

Figure 4:
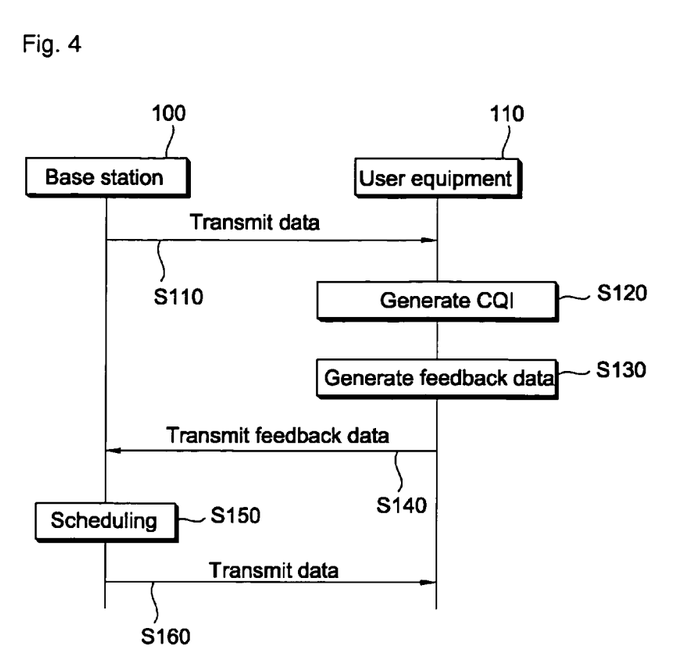
FIG. 4 is a flowchart illustrating communication between a base station and a user equipment.

FIG. 4 is a flowchart illustrating communication between a base station and a user equipment.

Referring to FIG. 4, the base station 100 transmits data to the user equipment 110 (S110). The data includes a preamble, a pilot signal, etc. for CQI measurement. The user equipment 110 generates CQI for each of the plurality of sub-bands (S120).

CQI refers to information that the user equipment 110 informs the base station 100 of the state of the downlink channel in order to assign downlink resources to the user equipment 110. Alternatively, CQI may refer to information that the base station 100 informs the user equipment 110 of the state of the downlink channel. For example, CQI can be various forms, such as signal-to-interference plus noise ratio (SINR), modulation and coding scheme (MCS) level, a data rate indicator and a received signal strength indicator. The controller 114 of the user equipment 110 can process CQI as the various forms by employing a channel provided from the channel estimator.

The user equipment 110 generates feedback data as a best CQI and a difference value of the best CQI as described later on (S130). The feedback data can be a deviation value of the best CQI. The user equipment 110 transmits the generated feedback data to the base station 100 (S140). The base station 100 schedules a transmission format, a power level, a date rate and the like based on the received feedback data (S150). The user equipment 110 processes data based on the decided transmission format, power level, data rate, and so on, and transmits processed data to the user equipment 110 (S160).

Figure 5:
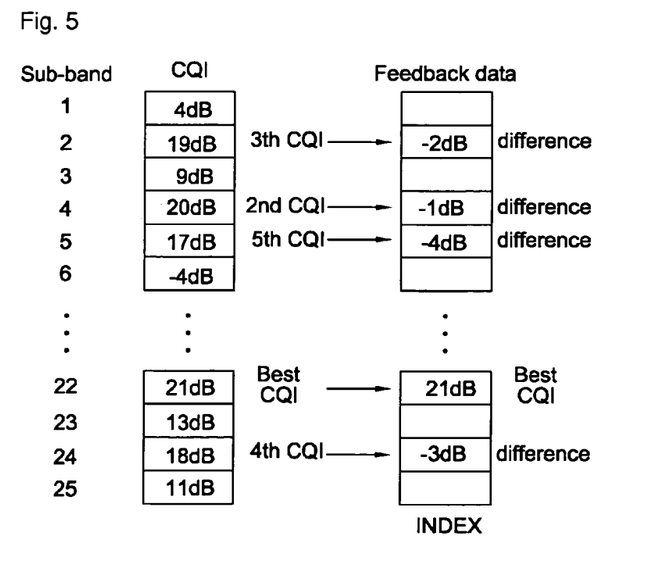
FIG. 5 is an exemplary view showing a method of generating feedback data in accordance with an embodiment of the present invention.

FIG. 5 is an exemplary view showing a method of generating feedback data in accordance with an embodiment of the present invention.

Referring to FIG. 5, a overall band is divided into a plurality of sub-bands. The sub-band is composed of a plurality of sub-carriers and can also be called a resource block, a resource tile, a bin or the like. The user equipment 110 generates one CQI per sub-band. When it is assumed that the overall band has N sub-bands, N CQIs can be obtained.

M sub-bands can be selected from the N sub-bands. The N sub-bands are ordered according to its CQI. M sub-bands having best M CQIs are selected. CQIs of the M sub-bands can be generated as feedback data. The feedback data includes a best CQI and difference values with the best CQI and other CQIs.

Here, it is assumed that N=25 and M=5. The CQI of the first band is 4 dB, the CQI of the second sub-band is 19 dB, the CQI of the fourth sub-band is 20 dB, the CQI of the fifth sub-band is 17 dB, the CQI of the twenty-second sub-band is 21 dB, and the CQI of twenty-fourth sub-band is 18 dB. In this example, the sub-band having the best CQI is the twenty-second sub-band.

The user equipment 110 transmits the feedback data for the selected five sub-bands. Feedback data may be the CQIs of the five sub-bands. Alternatively, Feedback data may be the best CQI and difference values between the best CQI and the remaining four CQIs. The difference value of the second sub-band is 19−21=−2 dB, the difference value of the fourth sub-band is 20−21=−1 dB, the difference value of the fifth sub-band is 17−21=−4 dB, and the difference value of the twenty-fourth sub-band is 18−21=−3 dB. Thus, feedback data becomes −2 dB, −1 dB, −4 dB, 21 dB and −3 dB. The feedback data can also include average CQIs of the remaining sub-bands other than the selected five sub-bands. Or, the feedback data can also include average CQIs of the overall sub-bands.

The feedback data further includes indices of the five sub-bands to indicate the five sub-bands selected from the 25 sub-bands. Or, the feedback data further includes a bitmap to indicate the five sub-bands selected from the 25 sub-bands. The bitmap for this example is '0101100000000000000001010'.

When CQI is represented as 5 bits and a difference value is represented as 2 bits, the bit number Ov of the feedback data can be expressed in the following equation:

MathFigure 1

$$O_v = 5 + (M-1) \times 2 + \text{ceil}\{\log_2\{P(N,M)\}\} \alpha 5 \quad [\text{Math.1}]$$

where N is the number of overall sub-bands, M is the number of selected sub-bands, P(N,M) is a probability permutation that M sub-bands are selected from N sub-bands, and ceil(x) denotes smallest integer larger than x. For example, when five sub-bands (M=5) are selected from 25 sub-bands (N=25), the bit number of feedback data becomes 41 bits. This equation corresponds to one best CQI, (M−1) difference values, indices for M sub-bands and one average CQI.

In the case where CQIs of M sub-bands selected from N sub-bands and an average CQI of the remaining sub-bands are transmitted as they are (5 bits), the bit number Ov of feedback data is expressed in the following Equation:

MathFigure 2

$$O_v = 5 \times 5 + \text{ceil}\{\log_2\{C(N,M)\}\} + 5 \quad [\text{Math.2}]$$

where N is the number of sub-bands, M is the number of selected sub-bands, and

C(N,M) is a probability combination that M sub-bands are selected from N sub-bands. When N=25 and M=5, the bit number of feedback data becomes 46 bits.

Thus, the bit number of the feedback data can be reduces when difference values are used. Accordingly, signaling overhead due to transmission of CQI can be reduced.

Figure 6:
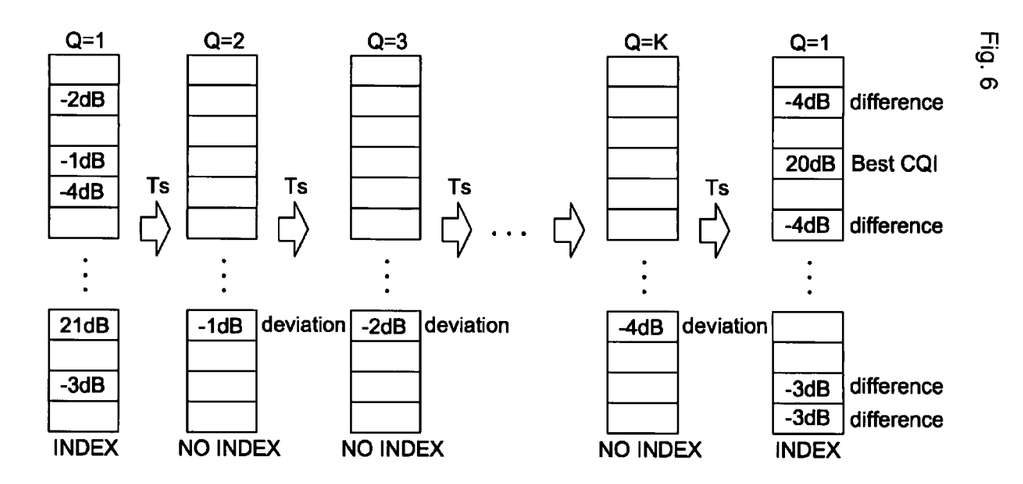
FIG. 6 is an exemplary view showing a method of transmitting CQI in accordance with an embodiment of the present invention.

FIG. 6 is an exemplary view showing a method of transmitting CQI in accordance with an embodiment of the present invention. This shows CQI is periodically transmitted at every transmission cycles.

Referring to FIG. 6, at first transmission cycle (Q=1), feedback data includes CQIs and indices (or a bitmap) of M sub-bands selected from N sub-bands. The CQIs of the M sub-bands are represented as a best CQI and difference values with the best CQI.

Here, feedback data generated in FIG. 5 is described as an example. It is assumed that M=5 and the best CQI is 21 dB and differences values are −2 dB, −1 dB, −4 dB, and −3 dB. The feedback data is listed in Table 1.

TABLE 1

| Sub-band | Feedback data (Q = 1) | Obtained CQI |
| --- | --- | --- |
| 2 | −2 dB | 19 dB |
| 4 | −1 dB | 20 dB |
| 5 | −4 dB | 17 dB |
| 22 | 21 dB | 21 dB |
| 24 | −3 dB | 18 dB |

If the feedback data is received, a base station can easily obtain the CQIs of the respective sub-bands are 19 dB, 20 dB, 17 dB, 21 dB and 18 dB from the best CQI and the difference values with the best CQI.

At second transmission cycle (Q=2), feedback data includes only a deviation value of the best CQI. The deviation value is a difference value between the best CQI and a CQI of a sub-band corresponding to the sub-band having the best CQI at previous transmission cycle. That is, the difference value of the sub-band having the best CQI is transmitted as the feedback data. When the CQI of the sub-band is 20 dB, the deviation value becomes 20−21=−1 dB. Since the bit number of the deviation value can be represented as 2 bits to 3 bits which is less than the bit number of CQI. Accordingly, the size of the feedback data at next transmission cycle can greatly be reduced.

The transmission cycle Ts of the feedback data can have a constant time interval or an irregular time interval. The transmission cycle Ts of the feedback data can be decided in various ways depending on the system and/or wireless environments. The transmission cycle Ts of the feedback data can be transmitted from the base station to the user equipment or from the user equipment to the base station. Or, The transmission cycle Ts of the feedback data can be previously known between the base station and the user equipment.

The base station can obtain CQIs of the sub-bands from the deviation value −1 dB at the second transmission cycle. The second feedback data having only the deviation value and obtained CQI at the base station can be as follows in Table 2.

TABLE 2

| Sub-band | Feedback data (Q = 2) | Obtained CQI |
| --- | --- | --- |
| 2 |  | 18 dB |
| 4 |  | 19 dB |
| 5 |  | 16 dB |
| 22 | −1 dB | 20 dB |
| 24 |  | 17 dB |

If the second feedback data is received, it can be seen that the CQIs of the respective sub-bands are 18 dB, 19 dB, 16 dB, 20 dB and 17 dB from the deviation value. For example, a base station can obtain current CQI of the 2nd sub-band by summing up the best CQI 21 dB, the difference value −2 dB and the deviation value −1 dB.

Although the channel condition is time-varying, it generally does not change seriously during one transmission cycle which is relatively very short. By transmitting difference value after full CQI is transmitted, signaling overhead can be reduced.

Moreover, it is not needed to transmit indices or a bitmap to indicate the M sub-bands at the second transmission cycle since the base station already knows the M sub-bands.

At a third transmission cycle (Q=3), feedback data can become a deviation value with respect to the best CQI at the first transmission cycle. When the deviation value is −2 dB, the feedback data is shown as Table 3.

TABLE 3

| Sub-band | Feedback data (Q = 2) | Obtained CQI |
|---|---|---|
| 2 |  | 17 dB |
| 4 |  | 18 dB |
| 5 |  | 15 dB |
| 22 | −2 dB | 19 dB |
| 24 |  | 16 dB |

If the feedback data is received, it can be seen that the CQIs of the respective sub-bands are 17 dB, 18 dB, 15 dB, 19 dB and 16 dB from the deviation value. For example, a base station can obtain current CQI of the 5th sub-band by summing up the best CQI 21 dB, the difference value −4 dB and the deviation value −2 dB. The deviation value is a difference value between the best CQI and a CQI of a sub-band corresponding to the sub-band having the best CQI at the first transmission cycle.

After the full CQI is transmitted at the frist transmission cycle, only a deviation value is transmiited at next transmission cycles. After the K-th transmission cycles is passed, full feedback data comprised of a best CQI and difference values with the best CQI, and indices is transmitted.

The number of transmission cycles K can be previously known between the base station and the user equipment. Or, the number of transmission cycles K can be transmitted from the base station o the user equipment or from the user equipment to the base station.

When five of 25 sub-bands are selected, the bit number of the full feedback data becomes 41 bits. On the contrary, when the deviation value is used, the bit number of the feedback data is only 2 to 3 bits. Accordingly, overhead due to transmission of CQI can be reduces.

Figure 7:
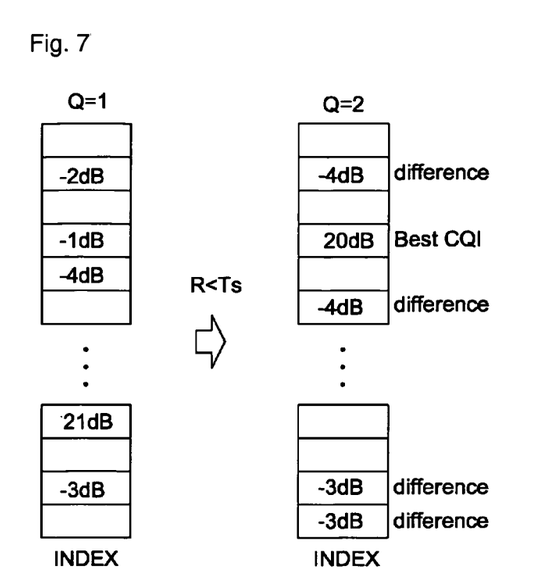
FIG. 7 is an exemplary view showing a method of transmitting CQI in accordance with another embodiment of the present invention.

FIG. 7 is an exemplary view showing a method of transmitting CQI in accordance with another embodiment of the present invention.

Referring to FIG. 7, a transmission method of feedback data may differ depending on systems and/or wireless environments. For example, in slow fading and fast fading, a transmission method of feedback data may be applied differently.

Transmission method of feedback data can be varied according to the transmission cycle Ts and a threshold time R. The threshold time R is a parameter to decide a transmission method of feedback data.

A case where R<Ts can be set to fast fading. In the case of fast fading (R<Ts), full feedback data including CQIs and indices of M sub-bands selected from N sub-bands is transmitted every transmission cycle. A case where R>Ts can be set to slow fading. In the case of slow fading (R>Ts), a deviation value can be used. A full feedback data is transmitted at a first transmission cycle and the deviation value as feedback data is transmitted at next transmission cycle.

The base station 100 can specify and transmit the threshold time R in the downlink direction or the user equipment 110 can specify and transmit the threshold time R in the uplink direction. Further, the threshold time R can be previously known between the base station and the user equipment.

Meanwhile, the resource assignment mode of data transmitted from the base station 100 to the user equipment 110 includes a localized mode and a distributed mode. The localized mode is a method of assigning one or more sub-bands to data by pairing a number of sub-carriers into the sub-band. The localized mode is generally used in a low speed or a closed-loop system. The distributed mode is a method of assigning sub-carriers, distributed in an overall band, to data. The distributed mode is generally used in a high speed or an open-loop system, and can obtain the diversity gain.

In the distributed mode, data is distributed over the overall band. It is thus not necessary to transmit CQI per on a sub-carrier or sub-band basis. In the distributed mode, an average CQI of the system frequency band can be transmitted.

In the localized mode, data is assigned to sub-bands. Thus, CQI can be transmitted per on a sub-band basis. In the localized mode, feedback data can be generated and transmitted as a best CQI and difference values with the best CQI as described above.

Information about according to which one of the distributed mode and the localized mode radio resources is assigned can become information shared by the base station and the user equipment. As a method of setting the CQI transmission method, an average CQI of the overall band can be transmitted in the case of the distributed mode, and feedback data can be generated and transmitted as a best CQI and difference values with the best CQI in the case of the localized mode.

As another method of setting the CQI transmission method, a parameter to specify the CQI transmission method can be transmitted in the downlink direction. The parameter may directly refer to the CQI transmission method. Further, the parameter may become a total sub-band number N, the number of selected sub-bands M, the feedback data transmission cycle Ts, the threshold time R, the transmission number K, and so on.

Figure 8:
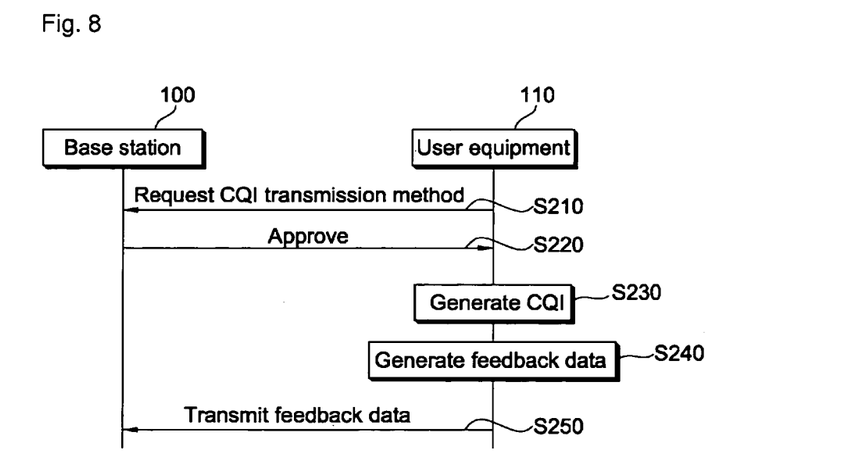
FIG. 8 is an exemplary view showing a method of transmitting CQI in accordance with still another embodiment of the present invention.

FIG. 8 is an exemplary view showing a method of transmitting CQI in accordance with still another embodiment of the present invention.

Referring to FIG. 8, the user equipment 110 can compare a previously transmitted sub-band-based CQI and a current CQI. If it is determined that a difference value between the previously transmitted sub-band-based CQI and the current CQI is not great, the user equipment 110 can request a CQI transmission method suitable for itself from the base station 100 (S210). The request from the base station 100 may become a parameter that refers to the total sub-band number N, the number of selected sub-bands M, the feedback data transmission cycle Ts, the threshold time R, the transmission number K, and so on. Further, the request to the base station 100 can become a message directly indicating the CQI transmission method. For example, in the case of slow fading, the user equipment 110 can request to extend the feedback data transmission cycle Ts. As mentioned earlier, the user equipment 110 can request to generate and transmit feedback data as a best CQI and differences with the best CQI. Further, the user equipment 110 can request to change the range of sub-bands and to generate and transmit CQIs of changed sub-bands. This is described later on.

The base station 100 checks and approves the request of the user equipment 110 (S220). Here, the base station 100 can inform the user equipment 110 of when CQI will be transmitted according to a requested method. For example, the user equipment 110 can request to change the CQI transmission method at a T time, and the base station 100 can inform the user equipment 110 of that feedback data will be transmitted according to a changed CQI transmission method from several transmission cycles (T+several Ts) since the T time. The user equipment 110 generates CQI according to a changed method from several transmission cycles (T+several Ts) (S230). The user equipment 110 generates feedback data including generated CQIs and necessary indices (S240). The user equipment 110 transmits generated feedback data to the base station 100 (S250).

Figure 9:
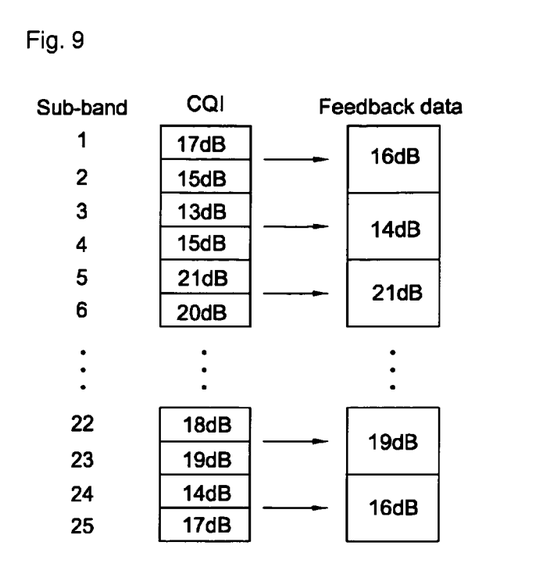
FIG. 9 is an exemplary view showing a method of transmitting CQI in accordance with further still another embodiment of the present invention.

FIG. 9 is an exemplary view showing a method of transmitting CQI in accordance with further still another embodiment of the present invention.

Referring to FIG. 9, a user equipment can differently decide the range of sub-bands according to a channel condition. The user equipment finds a sub-band-based CQI having a different range and transmits the found CQI. When a difference value between sub-band-based CQIs is small as in slow fading, the user equipment 110 can bind a plurality of sub-bands into one sub-band. The user equipment 110 can indicate CQIs of the plurality of sub-bands as one CQI. Further, the user equipment 110 can discriminate new sub-bands from the overall band firstly divided into sub-bands.

For example, it is assumed that as shown in the drawing, the overall band is divided into 25 sub-bands, and CQIs of the respective sub-bands are 17 dB, 15 dB, 13 dB, 15 dB, 21 dB, 20 dB, . . . , 18 dB, 19 dB, 14 dB, and 17 dB. The user equipment can bind the first sub-band and the second sub-band into one sub-band. A CQI of the one sub-band can become (17+15)/2=16 dB, that is, an average of the first sub-band and the second sub-band. The user equipment 110 can bind the third sub-band and the fourth sub-band into one sub-band, which has an average CQI, (13+15)/2=14 dB. The user equipment can bind two sub-bands into one sub-band and represent a CQI of the one sub-band as an average CQI. The user equipment can bind 25 sub-bands every two sub-bands in order to produce 12 sub-bands. The user equipment 110 can generate and transmit 12 sub-band-based CQIs.

Here, a CQI of one sub-band in which a plurality of sub-bands are bound together can become not only an average CQI, but also a best CQI or a minimum CQI of CQIs of the included sub-bands. For example, when four sub-bands from a twenty-second sub-band to a twenty-fifth sub-band are bound into one sub-band, a CQI of the one sub-band becomes an average CQI (18+19+14+17)/4=17 dB or a best CQI 19 dB or a minimum CQI 14 dB.

The user equipment can use 25 sub-bands as 25 sub-bands as they are, produce twelve sub-bands by binding the 25 sub-bands every two sub-bands, five sub-bands by binding the 25 sub-bands every five sub-bands, two sub-bands by binding the 25 sub-bands every ten sub-bands, and bind the 25 sub-bands into one sub-band. The user equipment generates and transmits CQIs of sub-bands in which the 25 sub-bands are bound together. The user equipment can select and use one of the above five methods about how many of the 25 sub-bands will be bound. Further, the user equipment can bind a plurality of sub-bands in various numbers. That is, the user equipment 110 can bind N sub-bands every k and generates and transmits (N/k) CQIs (N>=k). The user equipment can newly discriminate sub-bands irrespective of the above range of the sub-bands. The user equipment can compare respective sub-band-based CQIs and CQIs of neighboring sub-bands and bind sub-bands having CQIs, which falls within a constant critical value, into one.

The user equipment transmits information about how the system frequency band has been discriminated to the base station. The user equipment transmits information about which one of decided methods has been selected, information about whether sub-bands have been bound within which threshold value, and so on to the base station. If the base station certificates information received from the user equipment, the user equipment generates and transmits CQI according to a changed method from a next transmission cycle Ts.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of transmitting a channel quality indicator (CQI) in a wireless communication system, the method comprising:
    transmitting a request for approving a CQI transmission scheme to a base station;
    receiving an approving signal for the request;
    generating CQIs according to the CQI transmission scheme; and
    transmitting the generated CQI to the base station;
    wherein the CQI transmission scheme comprises:
        obtaining a CQI of each of N sub-bands at a first transmission cycle;
        selecting a first sub-band having the best CQI and M−1 sub-bands having CQIs lower than the best CQI in the N sub-bands at the first transmission cycle;
        transmitting the best CQI of the first sub-band and difference values between the best CQI and the CQI of each of the M−1 sub-bands at the first transmission cycle; and
        transmitting only a difference value between the best CQI of the first sub-band and a CQI of the first sub-band at a second transmission cycle;
        wherein the CQI of each of the M−1 sub-bands at the second transmission cycle are determined by using the difference value between the best CQI of the first sub-band and the CQI of the first sub-band at the second transmission cycle.

2. The method of claim 1, wherein the CQI transmission second scheme further comprising comprises:
    transmitting indices of the first sub-band and the M−1 sub-bands.

3. The method of claim 1, wherein the method further comprising:
    receiving information for the first transmission cycle and the second transmission cycle of CQI and a threshold time from the base station.

4. The method of claim 1, wherein the approving signal for the request includes information indicating time duration which is applied to the CQI transmission scheme.

5. An apparatus of transmitting a channel quality indicator (CQI) in a wireless communication system, the apparatus comprising: a receiver; a transmitter; and a controller, coupled to the receiver and the transmitter, and configured to:
    transmit a request for approving a CQI transmission scheme to a base station;
    transmit an approving signal for the request;

generate CQIs according to the CQI transmission scheme; and transmit the generated CQI to the base station;

wherein the CQI transmission scheme comprises:

obtaining a CQI of each of N sub-bands at a first transmission cycle;

selecting a first sub-band having the best CQI and M−1 sub-bands having CQIs lower than the best CQI in the N sub-bands at the first transmission cycle;

transmitting the best CQI of the first sub-band and difference values between the best CQI and the CQI of each of the M−1 sub-bands at the first transmission cycle; and     transmitting only a difference value between the best CQI of the first sub-band and a CQI of the first sub-band at a second transmission cycle,     wherein the CQI of each of the M−1 sub-bands at the second transmission cycle are determined by using the difference value between the best CQI of the first sub-band and the CQI of the first sub-band at the second transmission cycle.

\* \* \* \* \*